United States Patent
Huang et al.

(10) Patent No.: US 11,240,671 B1
(45) Date of Patent: Feb. 1, 2022

(54) BLUETOOTH DEVICE CONNECTION METHODS AND BLUETOOTH DEVICES

(71) Applicant: ALIPAY (HANGZHOU) INFORMATION TECHNOLOGY CO., LTD., Zhejiang (CN)

(72) Inventors: Lin Huang, Hangzhou (CN); Dingliang Yan, Hangzhou (CN); Yunding Jian, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/356,457

(22) Filed: Jun. 23, 2021

(30) Foreign Application Priority Data

Aug. 26, 2020 (CN) .......................... 202010872748.6

(51) Int. Cl.
| | |
|---|---|
| H04W 4/00 | (2018.01) |
| H04W 12/50 | (2021.01) |
| H04W 76/14 | (2018.01) |
| H04W 12/03 | (2021.01) |
| H04W 72/00 | (2009.01) |
| H04W 4/80 | (2018.01) |

(52) U.S. Cl.
CPC ........... *H04W 12/50* (2021.01); *H04W 12/03* (2021.01); *H04W 72/005* (2013.01); *H04W 76/14* (2018.02); *H04W 4/80* (2018.02)

(58) Field of Classification Search
CPC ..... H04W 12/50; H04W 76/14; H04W 12/03; H04W 72/005; H04W 4/80
USPC ................................ 370/329, 311, 347, 509
See application file for complete search history.

(56) References Cited

U.S. PATENT DOCUMENTS

| | | | |
|---|---|---|---|
| 10,169,587 B1 * | 1/2019 | Nix .......................... | G06F 21/57 |
| 10,212,136 B1 | 2/2019 | Gehret et al. | |
| 10,263,779 B2 * | 4/2019 | Wu ...................... | H04L 63/0435 |
| 10,366,214 B2 * | 7/2019 | Li .......................... | H04W 76/10 |
| 10,574,466 B1 * | 2/2020 | Gopalakrishnan ...... | G06F 21/44 |
| 10,601,828 B2 * | 3/2020 | Avetisov ............... | H04L 9/3234 |

(Continued)

OTHER PUBLICATIONS

Bluetooth Core Specification Version 5.2 vol. 3, Part C, 10.8, Random Device Address.

(Continued)

*Primary Examiner* — Marceau Milord
(74) *Attorney, Agent, or Firm* — Fish & Richardson P.C.

(57) ABSTRACT

Disclosed herein are methods, systems, and media for providing Bluetooth connection between Bluetooth devices. One of the methods comprises: generating, by a first Bluetooth device, a code; encrypting the code to generate a first ciphertext in response to detecting that a Bluetooth connection is disconnected; generating, by the first Bluetooth device, a broadcast packet based on the first ciphertext, and broadcasting the broadcast packet to a second Bluetooth device; receiving a scanning request from the second Bluetooth device, the scanning request including a random private address; verifying the scanning request based on the random private address; sending, in response to verifying the scanning request, a scanning response to the second Bluetooth device based on the random private address in the scanning request; and establishing a Bluetooth connection with the second Bluetooth device in response to determining that a connection request from the second Bluetooth device is received.

17 Claims, 5 Drawing Sheets

(56) References Cited

U.S. PATENT DOCUMENTS

| | | | |
|---|---|---|---|
| 10,764,752 B1* | 9/2020 | Avetisov | H04L 63/062 |
| 10,810,388 B2* | 10/2020 | Kawaguchi | G06F 21/74 |
| 10,904,737 B2* | 1/2021 | Kang | H04W 76/14 |
| 11,089,441 B2* | 8/2021 | Eisner | H04W 4/029 |
| 2008/0022089 A1* | 1/2008 | Leedom | H04W 12/0431 |
| | | | 713/156 |
| 2010/0332841 A1* | 12/2010 | Watts | G06F 21/36 |
| | | | 713/182 |
| 2011/0022856 A1* | 1/2011 | Ureche | G06F 21/78 |
| | | | 713/193 |
| 2014/0304505 A1* | 10/2014 | Dawson | H04L 63/0428 |
| | | | 713/165 |
| 2015/0141005 A1* | 5/2015 | Suryavanshi | H04W 48/16 |
| | | | 455/434 |
| 2016/0085955 A1* | 3/2016 | Lerner | G06F 21/725 |
| | | | 726/20 |
| 2016/0092872 A1* | 3/2016 | Prakash | G06Q 20/3265 |
| | | | 705/65 |
| 2017/0118645 A1 | 4/2017 | Zarakas et al. | |
| 2017/0201499 A1* | 7/2017 | McLaughlin | H04L 63/0428 |
| 2018/0041479 A1* | 2/2018 | Wang | H04L 9/3263 |
| 2018/0295114 A1* | 10/2018 | Abdalla | H04L 9/0844 |
| 2019/0028445 A1* | 1/2019 | McLaughlin | H04W 12/02 |
| 2019/0081937 A1* | 3/2019 | Lu | H04L 63/0492 |
| 2019/0109820 A1* | 4/2019 | Clark | H04L 9/16 |
| 2019/0109821 A1* | 4/2019 | Clark | H04L 63/0272 |
| 2019/0109822 A1* | 4/2019 | Clark | H04L 63/0428 |
| 2019/0245681 A1* | 8/2019 | Alwen | H04L 9/0844 |
| 2019/0245682 A1* | 8/2019 | Alwen | H04L 9/16 |
| 2019/0313246 A1* | 10/2019 | Nix | H04L 9/3263 |
| 2019/0356482 A1* | 11/2019 | Nix | H04L 9/3066 |
| 2020/0004995 A1* | 1/2020 | Kawaguchi | G06K 19/0708 |
| 2020/0184547 A1* | 6/2020 | Andon | H04W 4/00 |
| 2020/0287879 A1* | 9/2020 | Chandoor | H04L 9/0618 |
| 2021/0044976 A1* | 2/2021 | Avetisov | H04L 9/3218 |
| 2021/0051139 A1* | 2/2021 | Wu | H04L 9/0841 |
| 2021/0119764 A1* | 4/2021 | Meghji | H04L 9/0643 |
| 2021/0119803 A1* | 4/2021 | Li | G06F 21/32 |
| 2021/0211279 A1* | 7/2021 | Nix | H04L 9/0841 |
| 2021/0258308 A1* | 8/2021 | Avetisov | G06F 21/45 |
| 2021/0266346 A1* | 8/2021 | Gordon | H04L 63/166 |

OTHER PUBLICATIONS

Bluetooth Core Specification Version 5.2 vol. 6, Part B, 1.3, Device Address.

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

Zhang et al. "Bless: A BLE Application Security Scanning Framework," Jul. 2020, IEEE Infocom 2020—IEEE Conference on Computer Communications, 636-645.

Zhang et al., "Breaking Secure Pairing of Bluetooth Low Energy Using Downgrade Attacks," 2020, USENIX Security Symposium.

Extended European Search Report in European Application No. 211814249, dated Dec. 16, 2021, 8 pages.

* cited by examiner

BLUETOOTH DEVICE CONNECTION METHODS AND BLUETOOTH DEVICES

CROSS-REFERENCE TO RELATED APPLICATIONS

This application claims priority to Chinese Patent Application No. 202010872748.6, filed on Aug. 26, 2020, which is hereby incorporated by reference in its entirety.

TECHNICAL FIELD

One or more embodiments of the present specification relate to the field of Bluetooth technologies, and in particular, to Bluetooth device connection methods and Bluetooth devices.

BACKGROUND

The Bluetooth technology is a special short-range wireless connection technology for creating a communication environment for Bluetooth devices and main control devices based on cost-effective short-range wireless connections.

During communication, the Bluetooth device sends related data. If the related data is intercepted by an attacker, information about the Bluetooth device is leaked, reducing the security of the Bluetooth device connection process. Therefore, for the previous disadvantage, a more reliable Bluetooth device connection solution needs to be provided.

SUMMARY

One or more embodiments of the present specification describe Bluetooth device connection methods and Bluetooth devices, which can improve the security of the Bluetooth device connection process.

According to a first aspect, a Bluetooth device connection method is provided, including the following:

An additional code is generated; the additional code is encrypted to generate a first ciphertext after it is detected that a Bluetooth connection is disconnected; a Bluetooth protocol-based broadcast packet is generated based on the first ciphertext, and the broadcast packet is sent; a scanning request sent by an external Bluetooth device is received; a Bluetooth protocol-based scanning response is sent to the external Bluetooth device based on a random private address included in the scanning request, where the random private address is an address generated by the external Bluetooth device for the scanning request; and a Bluetooth connection is established to the external Bluetooth device when a connection request sent by the external Bluetooth device is received.

In one or more embodiments, the generating an additional code includes: generating a random number to obtain the additional code; and the generating a Bluetooth protocol-based broadcast packet based on the first ciphertext further includes: adding an additional code in a plaintext form to the broadcast packet.

With reference to the first aspect, in a second possible implementation, the generating an additional code includes: periodically generating additional codes by using a predetermined additional code algorithm, where the additional code algorithm is an algorithm agreed upon jointly with the Bluetooth device connected through the Bluetooth connection; and the encrypting the additional code includes: encrypting an additional code generated in a current period.

In one or more embodiments, the encrypting the additional code to generate a first ciphertext includes: encrypting the additional code and a locally-stored key by using a first encryption algorithm to obtain the first ciphertext, where the first encryption algorithm is a unidirectional function, the local key is a key agreed upon jointly with the Bluetooth device connected through the Bluetooth connection, and the first encryption algorithm is an algorithm agreed upon jointly with the Bluetooth device connected through the Bluetooth connection.

In one or more embodiments, after the receiving a scanning request from an external Bluetooth device, and before the sending a Bluetooth protocol-based scanning response to the external Bluetooth device, the method further includes the following:

The random private address included in the scanning request is decrypted by using a second decryption algorithm based on the additional code and a locally-stored key, to obtain a fixed address; it is determined whether a fixed address stored is the same as the decrypted fixed address, where the fixed address stored is an address agreed upon jointly with the Bluetooth device connected through the Bluetooth connection, the local key is a key agreed upon jointly with the Bluetooth device connected through the Bluetooth connection, and the second decryption algorithm is an algorithm agreed upon jointly with the Bluetooth device connected through the Bluetooth connection; and if yes, the step of sending a Bluetooth protocol-based scanning response to the external Bluetooth device is performed.

In one or more embodiments, the sending a Bluetooth protocol-based scanning response to the external Bluetooth device based on a random private address included in the scanning request includes: encrypting the random private address included in the scanning request and the locally-stored key by using a third encryption algorithm, to obtain a second ciphertext, where the second encryption algorithm is a unidirectional function, and the local key is a key agreed upon jointly with the Bluetooth device connected through the Bluetooth connection; generating the Bluetooth protocol-based scanning response by using the second ciphertext; and sending the scanning response to the external Bluetooth device by using the random private address.

According to a second aspect, a Bluetooth device connection method is provided, including the following:

It is detected that a Bluetooth connection is disconnected; an additional code is obtained when a broadcast packet is monitored; validity of the broadcast packet is verified by using the additional code obtained; the additional code is encrypted to generate a random private address when it is determined that the broadcast packet is valid; the random private address is added to a Bluetooth protocol-based scanning request, and the scanning request is sent to an external Bluetooth device that sends the broadcast packet; and sending a connection request to the external Bluetooth device based on the random private address when a scanning response sent by the external Bluetooth device based on the random private address is received, to establish a connection to the external Bluetooth device by using the connection request.

In one or more embodiments, the broadcast packet includes an additional code in a plaintext form; and the obtaining an additional code includes: obtaining the additional code from the broadcast packet.

With reference to the second aspect, in a second possible implementation, additional codes are periodically generated by using a predetermined additional code algorithm, where the additional code algorithm is an algorithm agreed upon jointly with the Bluetooth device connected through the Bluetooth connection; and an additional code generated in a current period is obtained.

In one or more embodiments, the verifying validity of the broadcast packet by using the additional code obtained includes: encrypting the additional code obtained and a locally-stored key by using a first encryption algorithm to obtain a third ciphertext, where the first encryption algorithm is a unidirectional function, and the local key is a key agreed upon jointly with the Bluetooth device connected through the Bluetooth connection; determining whether the third ciphertext is the same as a first ciphertext in the broadcast packet; and if yes, determining that the broadcast packet is valid.

In one or more embodiments, the encrypting the additional code to generate a random private address includes: encrypting the additional code, a fixed address stored, and a locally-stored key by using a second encryption algorithm to obtain the random private address, where the fixed address is an address agreed upon jointly with the Bluetooth device connected through the Bluetooth connection, the local key is a key agreed upon jointly with the Bluetooth device connected through the Bluetooth connection, and the second encryption algorithm is an algorithm agreed upon jointly with the Bluetooth device connected through the Bluetooth connection.

In one or more embodiments, before the sending a connection request to the external Bluetooth device based on the random private address when a scanning response sent by the external Bluetooth device based on the random private address is received, the method further includes the following:

The random private address and the local key are encrypted by using a third encryption algorithm to obtain a fourth ciphertext; it is determined whether the fourth ciphertext is the same as a second ciphertext in the scanning response; and if yes, the step of sending a connection request to the external Bluetooth device based on the random private address is performed, where the local key is a key agreed upon jointly with the Bluetooth device connected through the Bluetooth connection, and the third encryption algorithm is an algorithm agreed upon jointly with the Bluetooth device connected through the Bluetooth connection.

According to a third aspect, a Bluetooth device is provided, including: an additional code generation module, configured to generate an additional code; a packet generation module, configured to encrypt the additional code generated by the additional code generation module to generate a first ciphertext after it is detected that a Bluetooth connection is disconnected; and generate a Bluetooth protocol-based broadcast packet based on the first ciphertext, and send the broadcast packet; and a request processing module, configured to receive a scanning request from an external Bluetooth device; send a Bluetooth protocol-based scanning response to the external Bluetooth device based on a random private address included in the scanning request, where the random private address is an address generated by the external Bluetooth device for the scanning request; and establish a Bluetooth connection to the external Bluetooth device when a connection request sent by the external Bluetooth device is received.

In one or more embodiments, the additional code generation module is configured to generate a random number to obtain the additional code; and the packet generation module is further configured to add an additional code in a plaintext form to the broadcast packet.

In one or more embodiments, the additional code generation module is configured to periodically generate additional codes by using a predetermined additional code algorithm, where the additional code algorithm is an algorithm agreed upon jointly with the Bluetooth device connected through the Bluetooth connection; and the packet generation module is configured to encrypt an additional code generated in a current period.

In one or more embodiments, the packet generation module is configured to encrypt the additional code and a locally-stored key by using a first encryption algorithm to obtain the first ciphertext, where the first encryption algorithm is a unidirectional function, the local key is a key agreed upon jointly with the Bluetooth device connected through the Bluetooth connection, and the first encryption algorithm is an algorithm agreed upon jointly with the Bluetooth device connected through the Bluetooth connection.

In one or more embodiments, the request processing module is configured to decrypt the random private address included in the scanning request by using a second decryption algorithm based on the additional code and a locally-stored key, to obtain a fixed address; determine whether a fixed address stored is the same as the decrypted fixed address, where the fixed address stored is an address agreed upon jointly with the Bluetooth device connected through the Bluetooth connection, the local key is a key agreed upon jointly with the Bluetooth device connected through the Bluetooth connection, and the second decryption algorithm is an algorithm agreed upon jointly with the Bluetooth device connected through the Bluetooth connection; and if yes, perform the step of sending a Bluetooth protocol-based scanning response to the external Bluetooth device.

In one or more embodiments, the request processing module is configured to encrypt the random private address included in the scanning request and the locally-stored key by using a third encryption algorithm to obtain a second ciphertext, where the second encryption algorithm is a unidirectional function, and the local key is a key agreed upon jointly with the Bluetooth device connected through the Bluetooth connection; generate the Bluetooth protocol-based scanning response by using the second ciphertext; and send the scanning response to the external Bluetooth device by using the random private address.

According to a fourth aspect, a Bluetooth device is provided, including: a connection detection module, configured to detect that a Bluetooth connection is disconnected; an additional code acquisition module, configured to obtain an additional code when a broadcast packet is monitored; a packet verification module, configured to verify validity of the broadcast packet by using the additional code obtained; and a connection processing module, configured to encrypt the additional code to generate a random private address when it is determined that the broadcast packet is valid; add the random private address to a Bluetooth protocol-based scanning request, and send the scanning request to an external Bluetooth device that sends the broadcast packet; and send, when a scanning response sent by the external Bluetooth device based on the random private address is received, a connection request to the external Bluetooth device based on the random private address, to establish a connection to the external Bluetooth device by using the connection request.

In one or more embodiments, the broadcast packet includes an additional code in a plaintext form; and the additional code acquisition module is configured to obtain the additional code from the broadcast packet.

In one or more embodiments, the additional code acquisition module is configured to periodically generate additional codes by using a predetermined additional code algorithm, where the additional code algorithm is an algorithm agreed upon jointly with the Bluetooth device connected through the Bluetooth connection; and obtain an additional code generated in a current period.

In one or more embodiments, the packet verification module is configured to encrypt the additional code obtained and a locally-stored key by using a first encryption algorithm to obtain a third ciphertext, where the first encryption algorithm is a unidirectional function, and the local key is a key agreed upon jointly with the Bluetooth device connected through the Bluetooth connection; determine whether the third ciphertext is the same as a first ciphertext in the broadcast packet; and if yes, determine that the broadcast packet is valid.

In one or more embodiments, the connection processing module is configured to encrypt the additional code, a fixed address stored, and a locally-stored key by using a second encryption algorithm to obtain the random private address, where the fixed address is an address agreed upon jointly with the Bluetooth device connected through the Bluetooth connection, the local key is a key agreed upon jointly with the Bluetooth device connected through the Bluetooth connection, and the second encryption algorithm is an algorithm agreed upon jointly with the Bluetooth device connected through the Bluetooth connection.

In one or more embodiments, the connection processing module is configured to encrypt the random private address and the local key by using a third encryption algorithm to obtain a fourth ciphertext; determine whether the fourth ciphertext is the same as a second ciphertext in the scanning response; and if yes, perform the step of sending a connection request to the external Bluetooth device based on the random private address, where the local key is a key agreed upon jointly with the Bluetooth device connected through the Bluetooth connection, and the third encryption algorithm is an algorithm agreed upon jointly with the Bluetooth device connected through the Bluetooth connection.

According to a fifth aspect, a computer-readable storage medium is provided. The computer-readable storage medium stores computer programs, and when being executed on a computer, the computer programs enable the computer to perform the method in any one of the previous embodiments.

According to a sixth aspect, a computing device is provided, including a memory and a processor. The memory stores executable code, and the processor implements the method in any one of the previous embodiments when executing the executable code.

According to the methods and the devices provided in the embodiments of the present specification, if it is detected that a Bluetooth connection is disconnected, a Bluetooth protocol-based broadcast packet can be first generated based on an additional code generated on site, and the broadcast packet is broadcast so that an external Bluetooth device that monitors the broadcast packet can return a random private address for a current scanning request, and a Bluetooth connection can be established, by using the private address, to the external Bluetooth device that sends the scanning request. Because the additional code is not a fixed value but is generated on site, the broadcast packet is not a fixed packet. In addition, because the random private address sent by the external Bluetooth device is also an address for the scanning request, the random private address for communicating with the external Bluetooth device that sends the scanning request is not fixed. Therefore, it can effectively alleviate the leakage of information transmitted between Bluetooth devices after Bluetooth device information is stolen and a connection is established to other Bluetooth devices, so that the security of the Bluetooth device connection process can be improved.

BRIEF DESCRIPTION OF DRAWINGS

To describe the technical solutions in the embodiments of the present specification or in the existing technology more clearly, the following briefly describes the accompanying drawings needed for describing the embodiments or the existing technology. Clearly, the accompanying drawings in the following description show some embodiments of the present specification, and a person of ordinary skill in the art can still derive other drawings from these accompanying drawings without creative efforts.

DESCRIPTION OF EMBODIMENTS

As described above, a Bluetooth device is a device that communicates based on a Bluetooth technology. Currently, when performing data exchange, various Bluetooth devices usually send fixed Bluetooth addresses of the Bluetooth devices, or return fixed attribute information used to represent attributes of the Bluetooth devices during scanning.

After the information sent by the Bluetooth device is intercepted by an attacker, the attacker may establish, based on the information intercepted, a connection to a device to which the Bluetooth device is to connect, to masquerade as the Bluetooth device to obtain communication data between the two devices, or the attacker uses the information intercepted for other purposes, which causes the leakage of the information of the Bluetooth device and reduces the security of the Bluetooth device connection process.

In addition, if the attacker has occupied a connection between the Bluetooth device and the device to be connected for a long time, the Bluetooth device cannot establish a connection to the device to be connected, which affects communication between the Bluetooth devices.

Therefore, according to the embodiments of the present specification, a dynamic additional code is generally used to perform verification between Bluetooth devices that communicate based on the Bluetooth technology. Because the additional code is not fixed, after the Bluetooth device is disconnected from a Bluetooth connection, the Bluetooth device is connected to the device to be connected by using the dynamic additional code, which can prevent attackers from masquerading as the Bluetooth device and establishing a connection to another Bluetooth device by using the fixed verification information, so that the security of the Bluetooth device connection process can be improved, and a connection between Bluetooth devices is more reliable.

Figure 1:
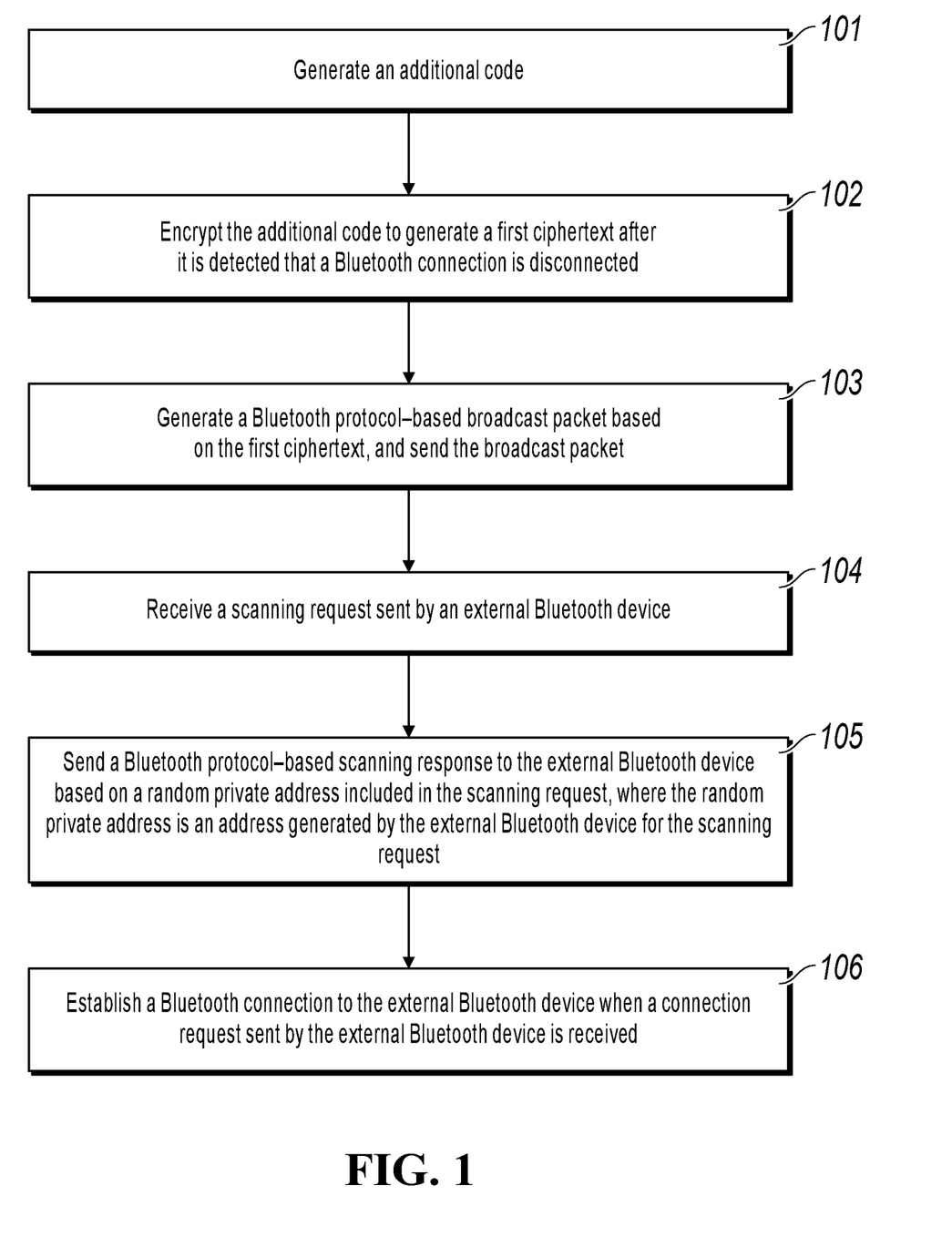
FIG. 1 is a flowchart illustrating a Bluetooth device connection method, according to one or more embodiments of the present specification.

Through the previously described description, a connection between Bluetooth devices in the existing technology is not secure. In view of this, one or more embodiments of the present specification provide a Bluetooth device connection method, applied to an initiator Bluetooth device. The initiator Bluetooth device is a device that will actively send a broadcast packet to actively initiate re-establishment of a Bluetooth connection after the Bluetooth connection is disconnected. As shown in FIG. 1, the method can specifically include the following steps:

Step 101: Generate an additional code.

Step 102: Encrypt the additional code to generate a first ciphertext after it is detected that a Bluetooth connection is disconnected.

Step 103: Generate a Bluetooth protocol-based broadcast packet based on the first ciphertext, and send the broadcast packet.

Step 104: Receive a scanning request sent by an external Bluetooth device.

Step 105: Send a Bluetooth protocol-based scanning response to the external Bluetooth device based on a random private address included in the scanning request, where the random private address is an address generated by the external Bluetooth device for the scanning request.

Step 106: Establish a Bluetooth connection to the external Bluetooth device when a connection request sent by the external Bluetooth device is received.

In the embodiments, if it is detected that a Bluetooth connection is disconnected, a Bluetooth protocol-based broadcast packet can be first generated based on an additional code generated on site, and the broadcast packet is broadcast so that an external Bluetooth device that monitors the broadcast packet can return a random private address for a current scanning request, and a Bluetooth connection can be established, by using the private address, to the external Bluetooth device that sends the scanning request. Because the additional code is not a fixed value but is generated on site, the broadcast packet is not a fixed packet. In addition, because the random private address sent by the external Bluetooth device is also an address for the scanning request, the random private address for communicating with the external Bluetooth device that sends the scanning request is not fixed. Therefore, it can effectively alleviate the leakage of information transmitted between Bluetooth devices after Bluetooth device information is stolen and a connection is established to other Bluetooth devices, so that the security of the Bluetooth device connection process can be improved.

It can be understood that before the Bluetooth connection is disconnected, Bluetooth devices connected through the Bluetooth connection can pre-agree upon a party that will actively send the broadcast packet after the Bluetooth connection is disconnected.

To improve the security of connection between Bluetooth devices, for the Bluetooth device that sends the broadcast packet, the embodiments of the present specification provide two additional code acquisition methods. In method 1, the Bluetooth device that will actively send the broadcast packet generates the additional code. In method 2, both the sender and the receiver of the broadcast packet generate additional codes simultaneously in an agreed way.

Method 1: A random number generated randomly is used as the additional code, and the additional code in the plaintext form is included in the broadcast packet. Because the additional code is generated randomly and cannot be predicted in advance, it can be more difficult to forge a broadcast packet. Then, the additional code in the plaintext form is included in the broadcast packet so that the external Bluetooth device that monitors the broadcast packet can verify the first ciphertext in the broadcast packet based on the additional code in the plaintext form, and determine whether the first ciphertext is a forged ciphertext, so as to determine the validity of the monitored broadcast packet, thereby improving the security of the Bluetooth device connection process.

Method 2: Before the Bluetooth connection is disconnected, an additional code algorithm is pre-agreed upon jointly with the Bluetooth device connected through the Bluetooth connection, and additional codes are generated by using the additional code algorithm at specified intervals, for example, 30 minutes, 120 minutes, or 500 minutes. Because the additional code algorithm is agreed upon with the Bluetooth device connected, the two devices can generate the same additional code at the same time point. Therefore, after the Bluetooth device monitors the broadcast packet, the Bluetooth device can verify the broadcast packet by using the additional code generated by the Bluetooth device, and determine whether the first ciphertext in the broadcast packet is the same as a ciphertext obtained by using the additional code generated by the Bluetooth device, so as to determine whether the broadcast packet is a packet sent by an attacker, thereby improving the security of the Bluetooth device connection process.

To further increase the difficulty for the attacker to forge a broadcast packet, in other embodiments, before the Bluetooth connection is disconnected, a common local key and a first encryption algorithm $F_1(x_1, y_1)$ used to generate the first ciphertext can be agreed upon with the Bluetooth device connected through the Bluetooth connection, and stored respectively, where $x_1$ represents a first variable of the first encryption algorithm, and $y_1$ represents a second variable of the first encryption algorithm. To further increase the difficulty of forging a broadcast packet and filter out the attacker by verifying the broadcast packet, the first encryption algorithm can be a unidirectional function. Based on this, the first ciphertext can be obtained by encrypting the additional code and the local key by using the first encryption algorithm. However, based on the first ciphertext and the additional code, the local key cannot be deduced by using the first encryption algorithm. Similarly, based on the first ciphertext and the local key, the additional code cannot be deduced by using the first encryption algorithm. Therefore, the first ciphertext can be obtained only after the additional code, the first encryption algorithm, and the local key are all obtained so as to generate the broadcast packet. In addition, because the additional code is a dynamic code, the attacker can be prevented from being connected to the Bluetooth device for a long time.

Specifically, the first ciphertext can be obtained in the following way: If the value of the additional code is assigned to the first variable $x_1$ of the first encryption algorithm $F_1(x_1, y_1)$, the value of the local key is assigned to the second variable $y_1$ of the first encryption algorithm $F_1(x_1, y_1)$. If the value of the additional code is assigned to the second variable $y_1$, the value of the local key is assigned to the first variable $x_1$. Then, the first ciphertext is generated by using the first encryption algorithm with assigned values.

To prevent the attacker from masquerading as the Bluetooth device connected before the Bluetooth connection is disconnected, in other embodiments, before the Bluetooth connection is disconnected, a second encryption algorithm $F_{2e}(x_{2e}, y_{2e}, z_{2e})$ used to generate the random private address, a second decryption algorithm $F_{2d}(x_{2d}, y_{2d}, z_{2d})$ used to verify the random private address, a local key, and a fixed address of the Bluetooth device are agreed upon jointly with the Bluetooth device connected through the Bluetooth device, where $x_{2d}$ represents a first variable of the second decryption algorithm, $y_{2d}$ represents a second variable of the second decryption algorithm, $z_{2d}$ represents a third variable of the second decryption algorithm, $x_{2e}$ represents a first variable of the second encryption algorithm, $y_{2e}$ represents a second variable of the second encryption algorithm, and $z_{2e}$ represents a third variable of the second encryption algorithm. Therefore, after the scanning request sent by the external Bluetooth device is received, the random private address included in the scanning request is decrypted based on the additional code and the local key by using the second decryption algorithm stored, to obtain a decrypted fixed address. The fixed address stored is compared with the decrypted fixed address to determine whether the two are the same. If the two are the same, it can be determined that the random private address included in the scanning request is not forged, that is, the random private address is trusted. Therefore, the random private address can be used to communicate with the Bluetooth device that sends the random private address.

The attacker cannot generate a correct random private address when failing to obtain the local key, the fixed address, the additional code, and the second encryption algorithm used to generate the private random address. Therefore, an incorrect address is obtained after an incorrect random private address included in a scanning request sent by the attacker is decrypted. By comparing the address with the fixed address stored, the attacker masquerading as the Bluetooth device can be filtered out, and the attacker fails to attack.

To further increase the difficulty of obtaining information of the Bluetooth device by the attacker, in other embodiments, before the Bluetooth connection is disconnected, a third encryption algorithm $F_3(x_3, y_3)$ used to encrypt the random private address and a local key can be agreed upon with the Bluetooth device connected through the Bluetooth connection. Therefore, after the scanning request is received, if the value of the random private address is assigned to a first variable of the third encryption algorithm $F_3(x_3, y_3)$, the local key is assigned to a second variable of the third encryption algorithm $F_3(x_3, y_3)$; otherwise, the local key is assigned to a first variable of $F_3(x_3, y_3)$. Then, a second ciphertext is generated by using the third encryption algorithm with assigned values. To ensure the security of the second ciphertext, the third encryption algorithm is a unidirectional function. Based on this, the attacker needs to obtain the third encryption algorithm and the local key to calculate the real second ciphertext. As such, the attacker masquerading as the Bluetooth device can be filtered out, and the attacker fails to attack, so that the security of the Bluetooth device connection process can be improved.

Figure 2:
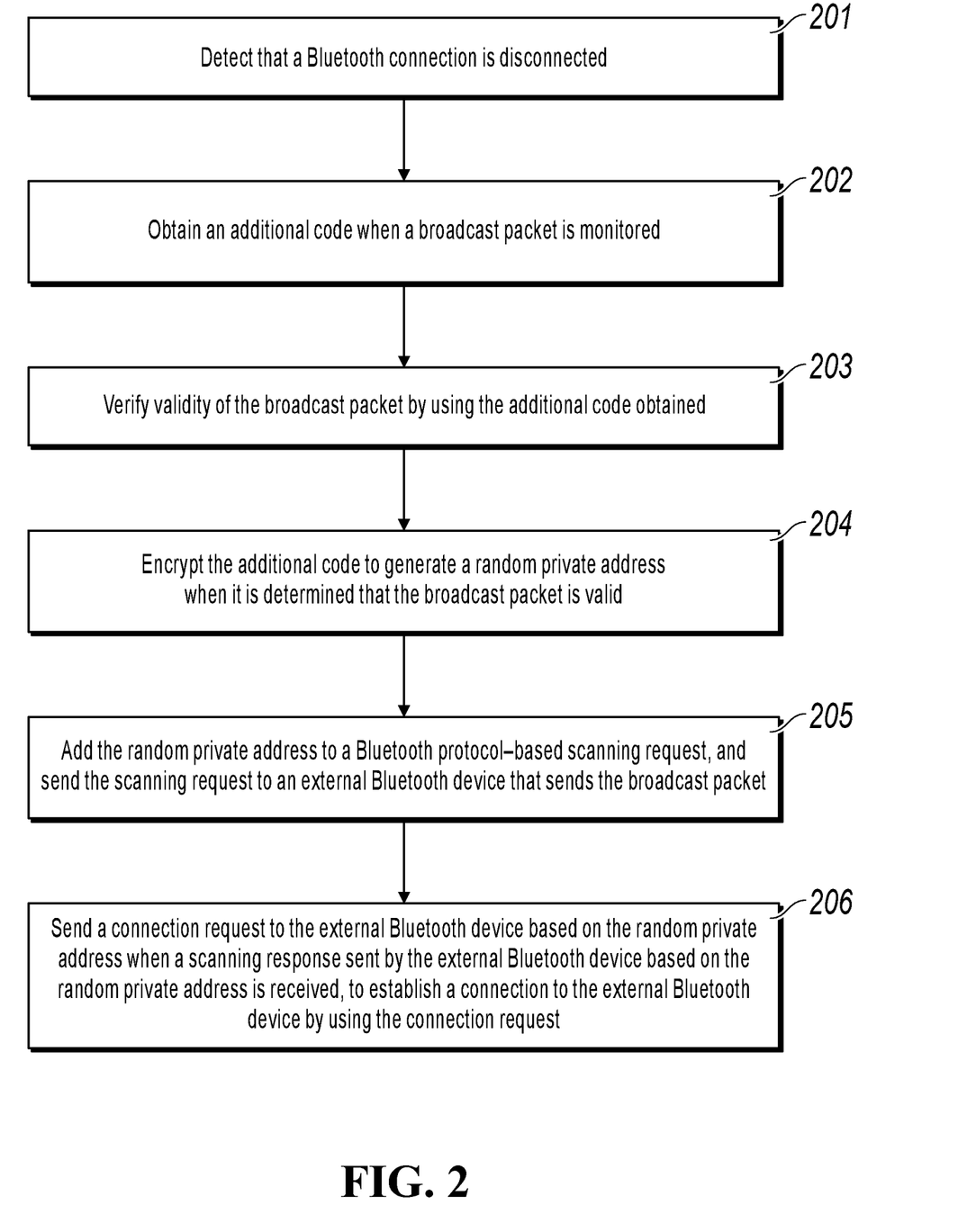
FIG. 2 is a flowchart illustrating a Bluetooth device connection method, according to other embodiments of the present specification.

One or more embodiments of the present specification provide a Bluetooth device connection method, applied to a receiver Bluetooth device. The receiver Bluetooth device is a device that will not actively initiate re-establishment of a Bluetooth connection but monitor a broadcast packet to re-establish the Bluetooth connection after the Bluetooth connection is disconnected. As shown in FIG. 2, the method can specifically include the following steps:

Step 201: Detect that a Bluetooth connection is disconnected.

Step 202: Obtain an additional code when a broadcast packet is monitored.

Step 203: Verify validity of the broadcast packet by using the additional code obtained.

Step 204: Encrypt the additional code to generate a random private address, when it is determined that the broadcast packet is valid.

Step 205: Add the random private address to a Bluetooth protocol-based scanning request, and send the scanning request to an external Bluetooth device that sends the broadcast packet.

Step 206: Send a connection request to the external Bluetooth device based on the random private address when a scanning response sent by the external Bluetooth device based on the random private address is received, to establish a connection to the external Bluetooth device by using the connection request.

In the embodiments, after it is detected that the Bluetooth connection is disconnected, the additional code can be first obtained based on the broadcast packet monitored, and then the broadcast packet monitored is verified to determine whether the broadcast packet is a packet forged by an attacker. After it is determined that the broadcast packet is not a packet forged by an attacker, the additional code can be encrypted, and then the random private address generated is added to the scanning request, and is sent to the external Bluetooth device that sends the broadcast packet. Because the random private address is an address generated based on a dynamic additional code, the random private address generated based on the additional code is not a fixed address. Therefore, the external Bluetooth device that sends the broadcast packet establishes a connection by using the random private address, which can effectively alleviate the leakage of information transmitted between Bluetooth devices after Bluetooth device information is stolen and a connection is established to other Bluetooth devices, so that the security of the Bluetooth device connection process can be improved.

It can be understood that before the Bluetooth connection is disconnected, Bluetooth devices connected through the Bluetooth connection can pre-agree upon a party that will actively send the broadcast packet after the Bluetooth connection is disconnected.

To improve the security of the Bluetooth device connection process, the embodiments of the present specification provide two additional code acquisition methods for the Bluetooth device that monitors the broadcast packet.

Method 1: The broadcast packet monitored includes an additional code in a plaintext form. Therefore, the additional code can be obtained from the broadcast packet, and the validity of the broadcast packet is verified by using the additional code, without a need to generate an additional code by the receiver Bluetooth device, so that processing operations of the Bluetooth device that receives the broadcast packet can be reduced.

Method 2: Before the Bluetooth connection is disconnected, an additional code algorithm used to generate an additional code and a period for generating an additional code are agreed upon jointly with the Bluetooth device connected through the Bluetooth connection. Therefore, the Bluetooth devices reaching the agreement can generate the same additional code by using the additional code algorithm based on the agreed period. For example, the Bluetooth devices generate one additional code every 180 minutes. Therefore, the agreed Bluetooth device that will actively send the broadcast packet generates the broadcast packet by using the additional code and broadcasts the broadcast packet. The agreed receiver Bluetooth device can verify the broadcast packet monitored by using an additional code generated by the receiver Bluetooth device in a period when the broadcast packet is monitored. If the broadcast packet is a packet generated by using an additional code obtained by using the agreed algorithm, it can be verified that the broadcast packet is valid; otherwise, it can be determined that the broadcast packet is a packet forged by an attacker.

To further increase the difficulty for the attacker to forge a broadcast packet, in other embodiments of the present specification, before the Bluetooth connection is disconnected, a local key and a first encryption algorithm $F_1(x_1, y_1)$ used to generate a first ciphertext can be agreed upon between the Bluetooth devices connected through the Bluetooth connection, and stored respectively, where $x_1$ represents a first variable of the first encryption algorithm, and $y_1$ represents a second variable of the first encryption algorithm. To further increase the difficulty of forging a broadcast packet and filter out the attacker by verifying the broadcast packet, the first encryption algorithm can be a unidirectional function. Based on this, the attacker needs to obtain the local key and the first encryption algorithm to calculate a correct first ciphertext, so as to generate a broadcast packet. Otherwise, the attacker cannot generate a correct broadcast packet. In addition, because the additional code is a dynamic code and is a code generated on site, the attacker cannot establish a long-time connection to the Bluetooth device connected through the Bluetooth connection after obtaining one additional code. Therefore, the difficulty of the attacker in masquerading as the device can be further increased, and the security of the Bluetooth device can be improved.

Therefore, after the broadcast packet is monitored, if the value of the additional code obtained is assigned to the first variable $x_1$ of the first encryption algorithm, the value of the locally-stored key is assigned to the second variable $y_1$ of the first encryption algorithm $F_1(x_1, y_1)$. If the value of the additional code obtained is assigned to the second variable $y_1$, the local key is assigned to the first variable $x_1$. Then, a third ciphertext can be generated by using the first encryption algorithm with assigned values. The third ciphertext is compared with the first ciphertext in the broadcast packet. If the two are the same, it can be determined that the broadcast packet is not forged, and the broadcast packet is valid. Therefore, the receiver Bluetooth device can further interact with the Bluetooth device that sends the broadcast packet. If the two are different, it can be determined that the broadcast packet is forged, and therefore, the receiver Bluetooth device does not need to further interact with the Bluetooth device that sends the broadcast packet.

Specifically, the locally-stored key can be a key agreed upon when the Bluetooth devices establish the Bluetooth connection for the first time, or can be a key agreed upon again after the Bluetooth devices establish the Bluetooth connection for the nth time, where n is greater than 1.

To prevent the attacker from forging the random private address, in other embodiments of the present specification, before the Bluetooth connection is disconnected, a common local key, a fixed address, a second encryption algorithm $F_{2e}(x_{2e}, y_{2e}, z_{2e})$ used to generate the random private address, and a second decryption algorithm $F_{2d}(x_{2d}, y_{2d}, z_{2d})$ used to verify the random private address can be agreed upon jointly with the Bluetooth device connected through the Bluetooth device, where $x_{2d}$ represents a first variable of the second decryption algorithm, $y_{2d}$ represents a second variable of the second decryption algorithm, $z_{2d}$ represents a third variable of the second decryption algorithm, $x_{2e}$ represents a first variable of the second encryption algorithm, $y_{2e}$ represents a second variable of the second encryption algorithm, and $z_{2e}$ represents a third variable of the second encryption algorithm. The random private address can be generated when it is determined that the broadcast packet monitored is valid. The random private address can be generated in the following way: Values of the additional code, the local key, and the fixed addresses are assigned to the variables of the second encryption algorithm, and then the random private address is generated by using the second encryption algorithm with assigned values. If the attacker masquerades as the Bluetooth device that monitors the broadcast packet, the attacker cannot generate a correct random private address when failing to obtain the local key, the fixed address, and the second encryption algorithm. Therefore, after receiving the scanning request and verifying the random private address, the external Bluetooth device can identify whether the scanning request is a request sent by the attacker.

To prevent the attacker from forging a scanning response, in other embodiments of the present specification, before the Bluetooth connection is disconnected, a common local key and a third encryption algorithm $F_3(x_3, y_3)$ used to verify the scanning response can be agreed upon with the Bluetooth device connected through the Bluetooth connection, where $x_3$ represents a first variable of the third encryption algorithm, and $y_3$ represents a second variable of the third encryption algorithm. After the scanning response is received, values of the random private address and the locally-stored key can be assigned to the third encryption algorithm, and then a fourth ciphertext is generated by using the third encryption algorithm with assigned values. By comparing the fourth ciphertext with the second ciphertext in the scanning response, it can be determined whether the scanning response is a response forged by the attacker. If the scanning response is not forged by the attacker, a connection can be established to the external Bluetooth device that sends the scanning response. Otherwise, there is no need to interact with the external Bluetooth device that sends the scanning response.

Figure 3:
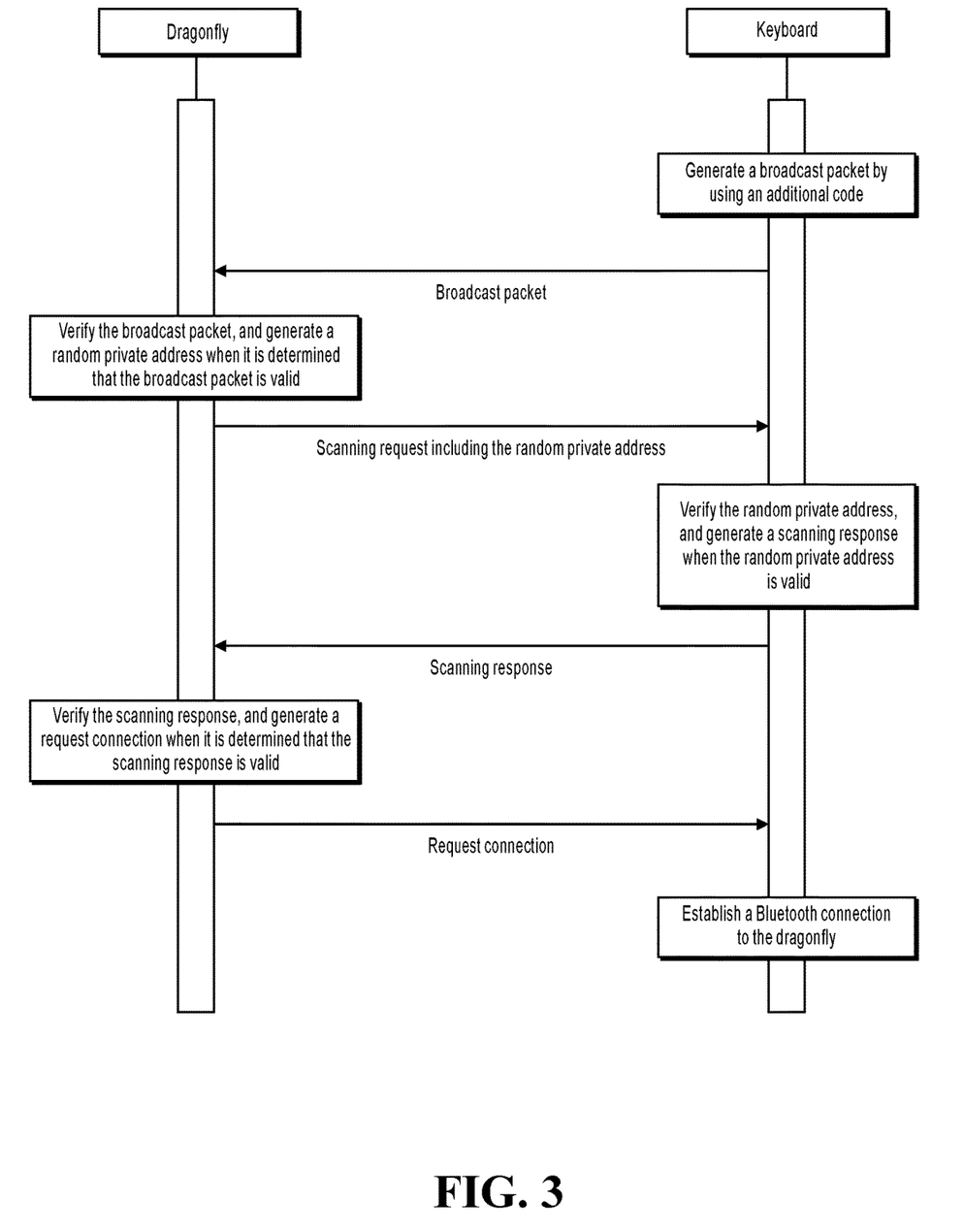
FIG. 3 is a schematic diagram illustrating a connection between two Bluetooth devices, according to one or more embodiments of the present specification.

Bluetooth devices "dragonfly" and "keyboard" that perform data exchange based on a Bluetooth technology are used as examples below to describe the Bluetooth device connection method provided in the embodiments of the present specification. As shown in FIG. 3, the method can specifically include the following steps:

Step 301: The keyboard generates an additional code, and encrypts a local key and the additional code by using a first encryption algorithm pre-agreed upon with the dragonfly to obtain a first ciphertext and sends a broadcast packet generated based on the first ciphertext, after identifying that a Bluetooth connection between the keyboard and the dragonfly is disconnected.

Specifically, before the Bluetooth connection is disconnected, the keyboard and the dragonfly can agree that the keyboard will actively send the broadcast packet after the Bluetooth connection is disconnected, and agree upon whether an additional code for generating the broadcast packet is generated by the keyboard alone or periodically generated by both parties based on the same algorithm. The additional code is generated on site, and is not a fixed code. Therefore, the broadcast packet obtained after the Bluetooth connection is disconnected is not a fixed packet, so that the difficulty of stealing data of the Bluetooth device by an attacker can be increased.

Step 302: After monitoring the broadcast packet, the dragonfly obtains the additional code, and verifies the first ciphertext in the broadcast packet by using the first encryption algorithm, the local key, and the additional code pre-agreed upon with the keyboard. If the broadcast packet is valid, the dragonfly generates a random private address by using a second encryption algorithm, the local key, and a fixed address agreed upon with the keyboard, and then sends a scanning request including the random private address to the keyboard.

Specifically, after monitoring the broadcast packet, the dragonfly can obtain a corresponding additional code based on a pre-agreed additional code acquisition method. For example, if the agreed additional code acquisition method is that the broadcast packet includes an additional code in a plaintext form, the dragonfly reads the additional code from the broadcast packet. Or, if the agreed additional code acquisition method is that both parties periodically generate additional codes based on the additional code algorithm, the dragonfly can verify the broadcast packet by using an additional code generated in a current period.

When the dragonfly verifies that the broadcast packet is valid, which is a third ciphertext obtained by using the first encryption algorithm based on the additional code and the local key agreed upon with the keyboard is the same as that in the broadcast packet, the dragonfly determines that the broadcast packet is valid. Then, the dragonfly generates the random private address by using the second encryption algorithm agreed upon with the keyboard based on the local key, the fixed address, and the additional code, adds the random private address to the scanning request, and sends the scanning request to the keyboard.

Step 303: The keyboard decrypts the random private address in the scanning request by using a second decryption algorithm agreed upon with the dragonfly and the local key, and if a fixed address obtained is the same as a fixed address stored, generates a third ciphertext by using a third encryption algorithm agreed upon with the dragonfly, the local key, and the random private address, then generates a scanning response, and sends the scanning response to the dragonfly by using the random private address.

Specifically, after receiving the scanning request, the keyboard needs to verify the random private address in the scanning request, to be specific, decrypt the random private address by using the second decryption algorithm agreed upon with the dragonfly and the additional code generated by the keyboard. If the fixed address obtained is the same as the agreed fixed address, it indicates that the random private address is an address generated by the dragonfly. Therefore, the keyboard can encrypt the random private address and the local key by using the third encryption algorithm to obtain the scanning response and send the scanning response to the dragonfly.

Step 304: The dragonfly monitors the random private address, and after receiving the scanning response, the dragonfly generates a fourth ciphertext by using the third encryption algorithm agreed upon with the keyboard, the local key, and the random private address generated by the dragonfly, compares the fourth ciphertext with a second ciphertext in the scanning response, and sends a connection request to the keyboard when determining that the two are the same.

Specifically, after receiving the scanning response, the dragonfly further needs to verify the scanning response, to be specific, encrypt, by using the third encryption algorithm, the locally-stored key by the dragonfly and the random private address generated by the dragonfly. If the fourth ciphertext obtained is the same as the second ciphertext in the scanning response, it represents that the scanning response is a response sent by the keyboard, and therefore, the dragonfly can establish a Bluetooth connection to the keyboard.

Step 305: The keyboard establishes a Bluetooth connection to the dragonfly after receiving the connection request.

In conclusion, because the additional code is dynamically generated, and the first encryption algorithm, the second encryption algorithm, the second decryption algorithm, the third encryption algorithm, the local key, and the fixed address are agreed upon between the Bluetooth devices that establish a Bluetooth connection, the attacker cannot forge a correct broadcast packet, random private address, scanning request, and scanning response when failing to obtain the previously agreed content. Therefore, the attacker can be effectively prevented from masquerading as the Bluetooth device to establish a connection to other devices by using intercepted information, so that the security of the Bluetooth device connection process can be improved.

It is worthwhile to note that the broadcast packet includes Bluetooth protocol-based ADV_IND, the scanning request includes Bluetooth protocol-based SCAN_REQ, and the scanning response includes Bluetooth protocol-based SCAN_RSP.

The first encryption algorithm and the third encryption algorithm in any one of the previous embodiments include any one of a hash algorithm, an advanced encryption standard (AES) algorithm, an MD5 algorithm, a message authentication code (MAC) algorithm, and a cyclic redundancy code (CRC) algorithm, but are not limited thereto.

Figure 4:
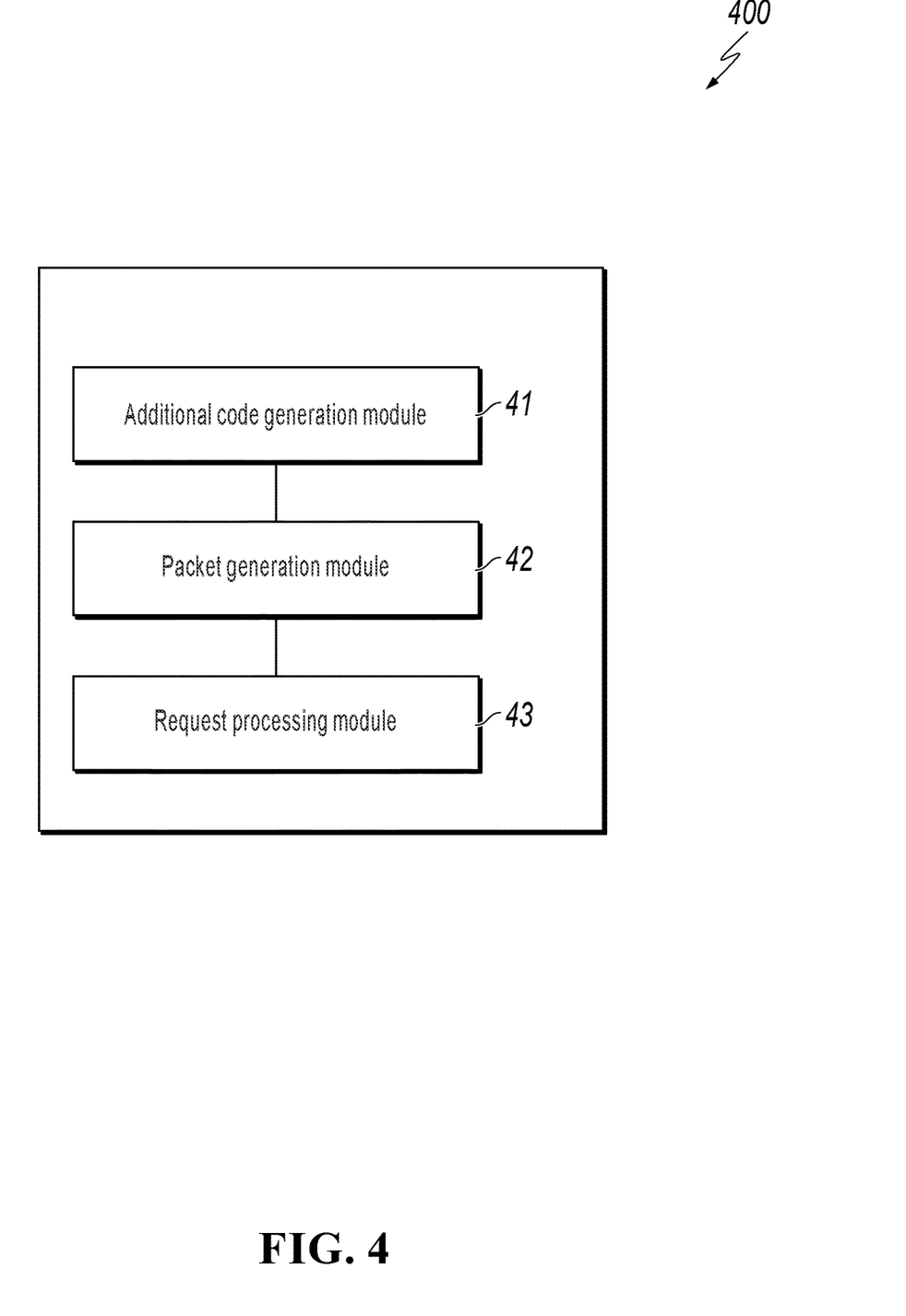
FIG. 4 is a schematic diagram illustrating a Bluetooth device, according to one or more embodiments of the present specification.

One or more embodiments of the present specification provide a Bluetooth device. As shown in FIG. 4, the Bluetooth device can initiate re-establishment of a Bluetooth connection, and the Bluetooth device 400 includes:

an additional code generation module 41, configured to generate an additional code;

a packet generation module 42, configured to encrypt the additional code generated by the additional code generation module 41 to generate a first ciphertext after it is detected that a Bluetooth connection is disconnected; and generate a Bluetooth protocol-based broadcast packet based on the first ciphertext, and send the broadcast packet; and a request processing module 43, configured to receive a scanning request from an external Bluetooth device; send a Bluetooth protocol-based scanning response to the external Bluetooth device based on a random private address included in the scanning request, where the random private address is an address generated by the external Bluetooth device for the scanning request; and establish a Bluetooth connection to the external Bluetooth device when a connection request sent by the external Bluetooth device is received.

In other embodiments of the present specification, the additional code generation module 41 is configured to generate a random number to obtain the additional code; and the packet generation module 42 is further configured to add an additional code in a plaintext form to the broadcast packet.

In other embodiments of the present specification, the additional code generation module 41 is configured to periodically generate additional codes by using a predetermined additional code algorithm, where the additional code algorithm is an algorithm agreed upon jointly with the Bluetooth device connected through the Bluetooth connection; and the packet generation module 42 is configured to encrypt an additional code generated in a current period.

In other embodiments of the present specification, the packet generation module 42 is configured to encrypt the additional code and a locally-stored key by using a first encryption algorithm to obtain the first ciphertext, where the first encryption algorithm is a unidirectional function, the local key is a key agreed upon jointly with the Bluetooth device connected through the Bluetooth connection, and the first encryption algorithm is an algorithm agreed upon jointly with the Bluetooth device connected through the Bluetooth connection.

In other embodiments of the present specification, the request processing module 43 is configured to decrypt the random private address included in the scanning request by using a second decryption algorithm based on the additional code and a locally-stored key, to obtain a fixed address; determine whether a fixed address stored is the same as the decrypted fixed address, where the fixed address stored is an address agreed upon jointly with the Bluetooth device connected through the Bluetooth connection, the local key is a key agreed upon jointly with the Bluetooth device connected through the Bluetooth connection, and the second decryption algorithm is an algorithm agreed upon jointly with the Bluetooth device connected through the Bluetooth connection; and if yes, perform the step of sending a Bluetooth protocol-based scanning response to the external Bluetooth device.

In other embodiments of the present specification, the request processing module 43 is configured to encrypt the random private address included in the scanning request and the locally-stored key by using a third encryption algorithm to obtain a second ciphertext, where the second encryption algorithm is a unidirectional function, and the local key is a key agreed upon jointly with the Bluetooth device connected through the Bluetooth connection; generate the Bluetooth protocol-based scanning response by using the second ciphertext; and send the scanning response to the external Bluetooth device by using the random private address.

Figure 5:
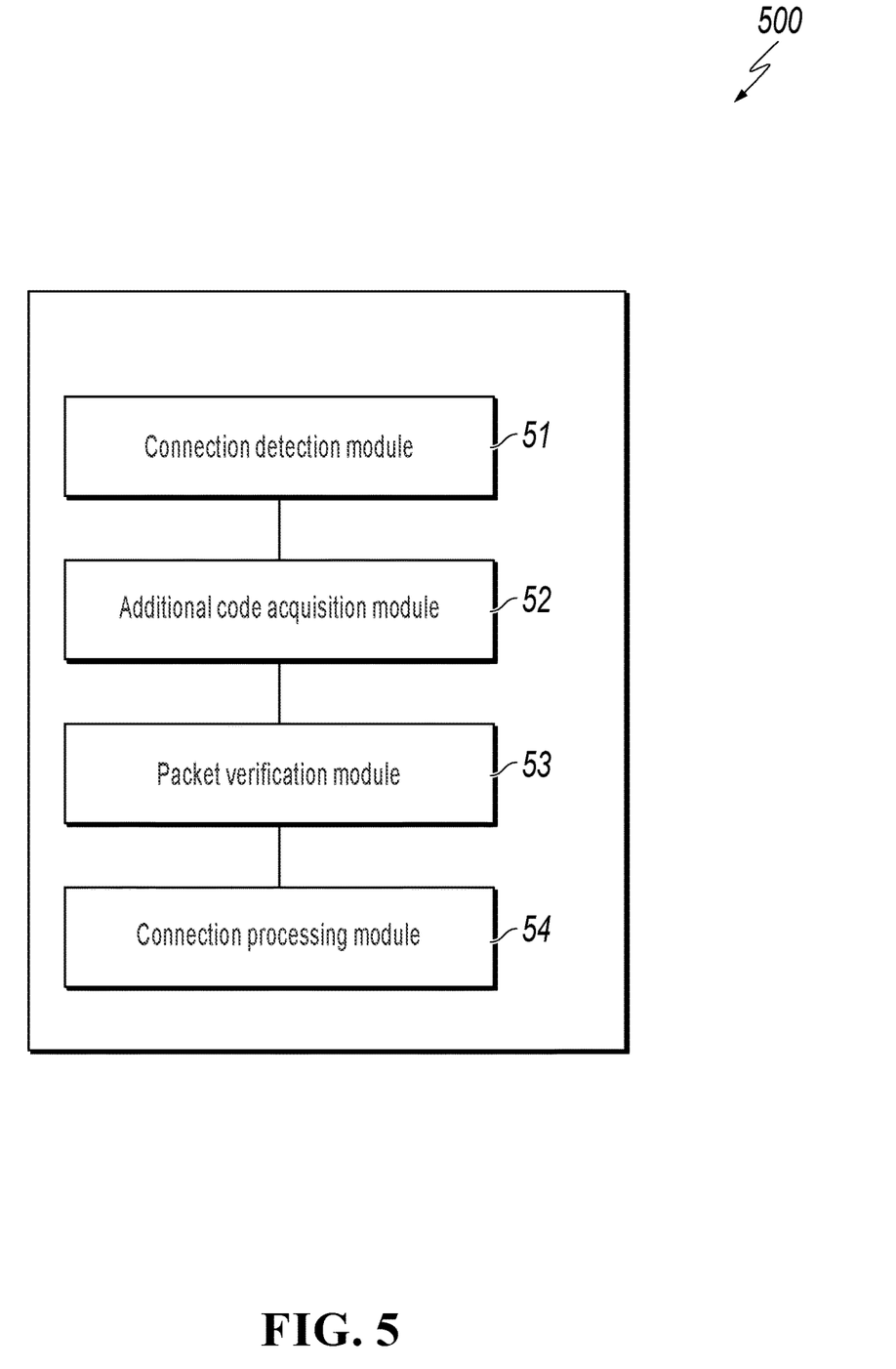
FIG. 5 is a schematic diagram illustrating a Bluetooth device, according to other embodiments of the present specification.

One or more embodiments of the present specification provide a Bluetooth device. The Bluetooth device does not actively initiate re-establishment of a Bluetooth connection. As shown in FIG. 5, the Bluetooth device 500 includes:

a connection detection module 51, configured to detect that a Bluetooth connection is disconnected;

an additional code acquisition module 52, configured to obtain an additional code when a broadcast packet is monitored;

a packet verification module 53, configured to verify validity of the broadcast packet by using the additional code obtained by the additional code acquisition module 52; and a connection processing module 54, configured to encrypt the additional code to generate a random private address when the packet verification module 53 determines that the broadcast packet is valid; add the random private address to a Bluetooth protocol-based scanning request, and send the scanning request to an external Bluetooth device that sends the broadcast packet; and send a connection request to the external Bluetooth device based on the random private address when a scanning response sent by the external Bluetooth device based on the random private address is received, to establish a connection to the external Bluetooth device by using the connection request.

In other embodiments of the present specification, the broadcast packet includes an additional code in a plaintext form; and the additional code acquisition module 52 is configured to obtain the additional code from the broadcast packet.

In other embodiments of the present specification, the additional code acquisition module 52 is configured to periodically generate additional codes by using a predetermined additional code algorithm, where the additional code algorithm is an algorithm agreed upon jointly with the Bluetooth device connected through the Bluetooth connection; and obtain an additional code generated in a current period.

In other embodiments of the present specification, the packet verification module 53 is configured to encrypt the additional code obtained and a locally-stored key by using a first encryption algorithm to obtain a third ciphertext, where the first encryption algorithm is a unidirectional function, and the local key is a key agreed upon jointly with the Bluetooth device connected through the Bluetooth connection; determine whether the third ciphertext is the same as a first ciphertext in the broadcast packet; and if yes, determine that the broadcast packet is valid.

In other embodiments of the present specification, the connection processing module 54 is configured to encrypt the additional code, a fixed address stored, and a locally-stored key by using a second encryption algorithm to obtain the random private address, where the fixed address is an address agreed upon jointly with the Bluetooth device connected through the Bluetooth connection, the local key is a key agreed upon jointly with the Bluetooth device connected through the Bluetooth connection, and the second encryption algorithm is an algorithm agreed upon jointly with the Bluetooth device connected through the Bluetooth connection.

In other embodiments of the present specification, the connection processing module 54 is configured to encrypt the random private address and the local key by using a third encryption algorithm to obtain a fourth ciphertext; determine whether the fourth ciphertext is the same as a second ciphertext in the scanning response; and if yes, perform the step of sending a connection request to the external Bluetooth device based on the random private address, where the local key is a key agreed upon jointly with the Bluetooth device connected through the Bluetooth connection, and the third encryption algorithm is an algorithm agreed upon jointly with the Bluetooth device connected through the Bluetooth connection.

It can be understood that the structure shown in the embodiments of the present specification does not constitute a specific limitation on the Bluetooth device. In other embodiments of the present specification, the Bluetooth device can include more or fewer components than those shown in the figure, or can combine some components, or can split some components, or can have different component arrangements. The components shown can be implemented by hardware, software, or a combination of software and hardware.

Content such as information exchange between units in the previous apparatus and execution processes is based on the same concept as the method embodiments of the present specification. For specific content, references can be made to the description in the method embodiments of the present specification. Details are omitted here for simplicity.

The present specification further provides a computer-readable storage medium storing computer programs. When the computer programs are executed on a computer, the method in any one of the embodiments of the present specification is performed.

One or more embodiments of the present specification further provide a computing device including a memory and a processor. The memory stores executable code, and the processor implements the method in any one of the embodiments when executing the executable code.

A person skilled in the art should be aware that in the above one or more examples, functions described in the present disclosure can be implemented by hardware, software, firmware, or any combination thereof. When the functions are implemented by software, the functions can be stored in a computer-readable medium or transmitted as one or more instructions or code in the computer-readable medium.

The objectives, technical solutions, and benefits of the present disclosure are further described in detail in the earlier-described specific implementations. It should be understood that the earlier-described descriptions are merely specific implementations of the present disclosure, but are not intended to limit the protection scope of the present disclosure. Any modification, equivalent replacement, or improvement made within the spirit and principle of the present disclosure shall fall within the protection scope of the present disclosure.

What is claimed is:

1. A computer-implemented method, comprising:
generating, by a first Bluetooth device, a code; encrypting, by the first Bluetooth device, the code to generate a first ciphertext in response to detecting that a Bluetooth connection is disconnected; generating, by the first Bluetooth device, a broadcast packet based on the first ciphertext, and broadcasting the broadcast packet to one or more Bluetooth devices, wherein the one or more Bluetooth devices includes a second Bluetooth device external to the first Bluetooth device; receiving, by the first Bluetooth device, a scanning request from the second Bluetooth device, the scanning request including a random private address generated by the second Bluetooth device; verifying the scanning request from the second Bluetooth device based on the random private address; sending, by the first Bluetooth device and in response to verifying the scanning request, a scanning response to the second Bluetooth device based on the random private address in the scanning request; and establishing, by the first Bluetooth device, a Bluetooth connection with the second Bluetooth device in response to determining that a connection request from the second Bluetooth device is received by the first Bluetooth device in response to the scanning response; wherein verifying the scanning request from the second Bluetooth device based on the random private address occurs after receiving, by the first Bluetooth device, the scanning request from the second Bluetooth device, and before sending the scanning response to the second Bluetooth device, and the verifying comprises: decrypting the random private address in the scanning request by using a second decryption algorithm based on the code and a locally-stored key, to obtain a decrypted fixed address; determining whether a pre-stored fixed address at the first Bluetooth device is the same as the decrypted fixed address, wherein the pre-stored fixed address at the first Bluetooth device, the locally-stored key, and the second decryption algorithm are agreed upon jointly by the first and second Bluetooth devices; and in response to determining that the pre-stored fixed address is the same as the decrypted fixed address, sending the scanning response to the second Bluetooth device.

2. The computer-implemented method according to claim 1, wherein generating, by the first Bluetooth device, the code comprises:
generating a random number to obtain the code; and
generating, by the first Bluetooth device, the broadcast packet based on the first ciphertext further comprises:
including the code in a plaintext form in the broadcast packet.

3. The computer-implemented method according to claim 1, wherein generating, by the first Bluetooth device, the code comprises:
periodically generating by using a pre-determined algorithm, wherein the pre-determined algorithm is agreed upon jointly by the first and second Bluetooth devices; and
encrypting, by the first Bluetooth device, the code comprises encrypting the code generated in a current period.

4. The computer-implemented method according to claim 3, wherein
generating, by the first Bluetooth device, the broadcast packet based on the first ciphertext further comprises:
not including the code in a plain text form in the broadcast packet; and
allowing the second Bluetooth device to validate the code using at least information of the current period and the pre-determined algorithm.

5. The computer-implemented method according to claim 1, wherein encrypting, by the first Bluetooth device, the code to generate the first ciphertext comprises:
encrypting the code and a locally-stored key by using a first encryption algorithm to obtain the first ciphertext, wherein the first encryption algorithm is a unidirectional function, and wherein the locally-stored key and the first encryption algorithm are agreed upon jointly by the first and second Bluetooth devices.

6. The computer-implemented method according to claim 1, wherein sending the scanning response to the second Bluetooth device based on the random private address in the scanning request comprises:
encrypting the random private address in the scanning request and a locally-stored key by using a third encryption algorithm to obtain a second ciphertext, wherein the third encryption algorithm is a unidirectional function, and the locally-stored key is agreed upon jointly by the first and second Bluetooth devices;
generating the scanning response by using the second ciphertext; and
sending the scanning response to the second Bluetooth device by using the random private address.

7. A computer-implemented system, comprising:
one or more computers; and one or more computer memory devices interoperably coupled with the one or more computers and having tangible, non-transitory, machine-readable media storing one or more instructions that, when executed by the one or more computers, perform one or more operations comprising: generating, by a first Bluetooth device, a code; encrypting, by the first Bluetooth device, the code to generate a first ciphertext in response to detecting that a Bluetooth connection is disconnected; generating, by the first Bluetooth device, a broadcast packet based on the first ciphertext, and broadcasting the broadcast packet to one or more Bluetooth devices, wherein the one or more Bluetooth devices includes a second Bluetooth device external to the first Bluetooth device; receiving, by the first Bluetooth device, a scanning request from the second Bluetooth device, the scanning request including a random private address generated by the second Bluetooth device; verifying the scanning request from the second Bluetooth device based on the random private address; sending, by the first Bluetooth device and in response to verifying the scanning request, a scanning response to the second Bluetooth device based on the random private address in the scanning request; and establishing, by the first Bluetooth device, a Bluetooth connection with the second Bluetooth device in response to determining that a connection request from the second Bluetooth device is received by the first Bluetooth device in response to the scanning response; wherein verifying the scanning request from the second Bluetooth device based on the random private address occurs after receiving, by the first Bluetooth device, the scanning request from the second Bluetooth device, and before sending the scanning response to the second Bluetooth device, and the verifying comprises: decrypting the random private address in the scanning request by using a second decryption algorithm based on the code and a locally-stored key, to obtain a decrypted fixed address; determining whether a pre-stored fixed address at the first Bluetooth device is the same as the decrypted fixed address, wherein the pre-stored fixed address at the first Bluetooth device, the locally-stored key, and the second decryption algorithm are agreed upon jointly by the first and second Bluetooth devices; and in response to determining that the pre-stored fixed address is the same as the decrypted fixed address, sending the scanning response to the second Bluetooth device.

8. The computer-implemented system according to claim 7, wherein generating, by the first Bluetooth device, the code comprises:
generating a random number to obtain the code; and
generating, by the first Bluetooth device, the broadcast packet based on the first ciphertext further comprises:
including the code in a plaintext form in the broadcast packet.

9. The computer-implemented system according to claim 7, wherein generating, by the first Bluetooth device, the code comprises:
periodically generating by using a pre-determined algorithm, wherein the pre-determined algorithm is agreed upon jointly by the first and second Bluetooth devices; and
encrypting, by the first Bluetooth device, the code comprises encrypting the code generated in a current period.

10. The computer-implemented system according to claim 9, wherein
generating, by the first Bluetooth device, the broadcast packet based on the first ciphertext further comprises:
not including the code in a plain text form in the broadcast packet; and
allowing the second Bluetooth device to validate the code using at least information of the current period and the pre-determined algorithm.

11. The computer-implemented system according to claim 7, wherein encrypting, by the first Bluetooth device, the code to generate the first ciphertext comprises:
encrypting the code and a locally-stored key by using a first encryption algorithm to obtain the first ciphertext, wherein the first encryption algorithm is a unidirectional function, and wherein the locally-stored key and the first encryption algorithm are agreed upon jointly by the first and second Bluetooth devices.

12. The computer-implemented system according to claim 7, wherein sending the scanning response to the second Bluetooth device based on the random private address in the scanning request comprises:
encrypting the random private address in the scanning request and a locally-stored key by using a third encryption algorithm to obtain a second ciphertext, wherein the third encryption algorithm is a unidirectional function, and the locally-stored key is agreed upon jointly by the first and second Bluetooth devices;
generating the scanning response by using the second ciphertext; and
sending the scanning response to the second Bluetooth device by using the random private address.

13. A non-transitory, computer-readable medium storing one or more instructions executable by a computer system to perform operations comprising: generating, by a first Bluetooth device, a code; encrypting, by the first Bluetooth device, the code to generate a first ciphertext in response to detecting that a Bluetooth connection is disconnected; generating, by the first Bluetooth device, a broadcast packet based on the first ciphertext, and broadcasting the broadcast packet to one or more Bluetooth devices, wherein the one or more Bluetooth devices includes a second Bluetooth device external to the first Bluetooth device; receiving, by the first Bluetooth device, a scanning request from the second Bluetooth device, the scanning request including a random private address generated by the second Bluetooth device; verifying the scanning request from the second Bluetooth device based on the random private address; sending, by the first Bluetooth device and in response to verifying the scanning request, a scanning response to the second Bluetooth device based on the random private address in the scanning request; and establishing, by the first Bluetooth device, a Bluetooth connection with the second Bluetooth device in response to determining that a connection request from the second Bluetooth device is received by the first Bluetooth device in response to the scanning response; wherein verifying the scanning request from the second Bluetooth device based on the random private address occurs after receiving, by the first Bluetooth device, the scanning request from the second Bluetooth device, and before sending the scanning response to the second Bluetooth device, and the verifying comprises: decrypting the random private address in the scanning request by using a second decryption algorithm based on the code and a locally-stored key, to obtain a decrypted fixed address; determining whether a pre-stored fixed address at the first Bluetooth device is the same as the decrypted fixed address, wherein the pre-stored fixed address at the first Bluetooth device, the locally-stored key, and the second decryption algorithm are agreed upon jointly by the first and second Bluetooth devices; and in response to determining that the pre-stored fixed address is the same as the decrypted fixed address, sending the scanning response to the second Bluetooth device.

14. The non-transitory, computer-readable medium according to claim 13, wherein generating, by the first Bluetooth device, the code comprises:
generating a random number to obtain the code; and
generating, by the first Bluetooth device, the broadcast packet based on the first ciphertext further comprises:
including the code in a plaintext form in the broadcast packet.

15. The non-transitory, computer-readable medium according to claim 13, wherein generating, by the first Bluetooth device, the code comprises:

periodically generating by using a pre-determined algorithm, wherein the pre-determined algorithm is agreed upon jointly by the first and second Bluetooth devices; and encrypting, by the first Bluetooth device, the code comprises encrypting the code generated in a current period.

16. The non-transitory, computer-readable medium according to claim 13, wherein encrypting, by the first Bluetooth device, the code to generate the first ciphertext comprises:

encrypting the code and a locally-stored key by using a first encryption algorithm to obtain the first ciphertext, wherein the first encryption algorithm is a unidirectional function, and wherein the locally-stored key and the first encryption algorithm are agreed upon jointly by the first and second Bluetooth devices.

17. The non-transitory, computer-readable medium according to claim 13, wherein sending the scanning response to the second Bluetooth device based on the random private address in the scanning request comprises:

encrypting the random private address in the scanning request and a locally-stored key by using a third encryption algorithm to obtain a second ciphertext, wherein the third encryption algorithm is a unidirectional function, and the locally-stored key is agreed upon jointly by the first and second Bluetooth devices;

generating the scanning response by using the second ciphertext; and sending the scanning response to the second Bluetooth device by using the random private address.

* * * * *